United States Patent

[11] 3,573,500

[72] Inventor Charles E. Leonard
 South Burlington, Vt.
[21] Appl. No. 807,155
[22] Filed Jan. 24, 1969
 Division of Ser. No. 633,872, Apr. 26, 1966.
[45] Patented Apr. 6, 1971
[73] Assignee General Electric Company

[54] POWER AMPLIFIER CONTROL SYSTEM
 3 Claims, 3 Drawing Figs.
[52] U.S. Cl. .................................................. 307/252,
 307/305, 321/15, 328/67
[51] Int. Cl. ....................................................... H03k 17/00
[50] Field of Search ........................................... 307/252,
 305; 328/67; 321/15

[56] References Cited
 UNITED STATES PATENTS
3,259,829 7/1966 Feth ............................. 307/252

3,323,036 5/1967 Runyan ........................ 307/252

Primary Examiner—Donald D. Forrer
Assistant Examiner—David M. Carter
Attorneys—Harry C. Burgess, Irving M. Freedman, Frank L. Neuhauser, Oscar B. Waddell and Melvin M. Goldenberg ABSTRACT: A bidirectional motor control system and apparatus comprising a power amplifier utilizing a first pair of solid state controlled rectifiers for selective pulse frequency modulated motor operation in CCW or CW rotational direction, commutating circuit means for interruption of power from said first pair of controlled rectifiers, including a capacitor and at least one inductance, a second pair of solid state controlled rectifiers, signal supplying control means for selective and timed capacitor charge reversal, controlled rectifier triggering, steering of the commutating circuit output to the appropriate one of the first pair of controlled rectifiers, and lockout of the respective triggering signals.

INVENTOR:
CHARLES E. LEONARD,

BY

HIS ATTORNEY.

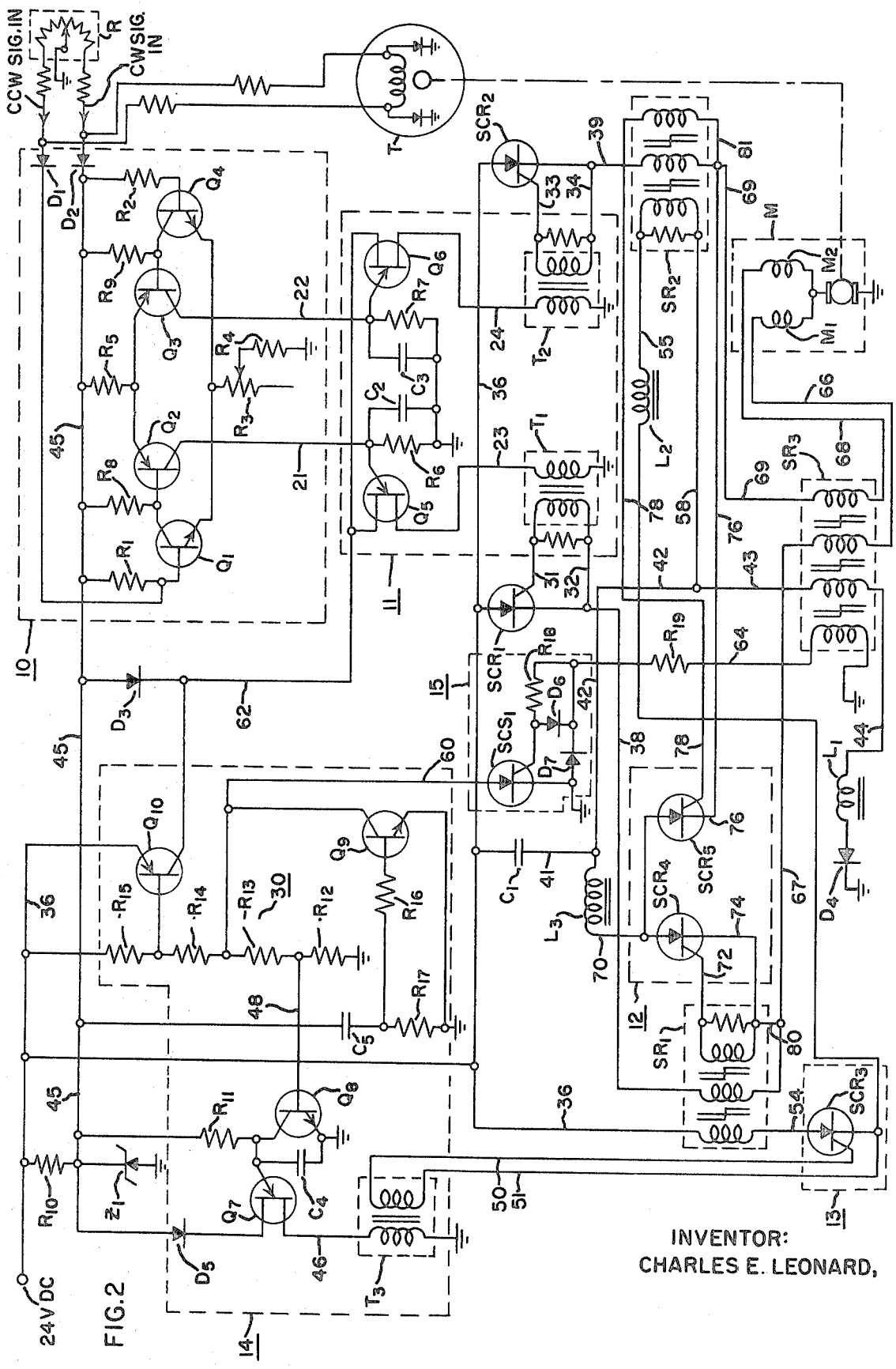

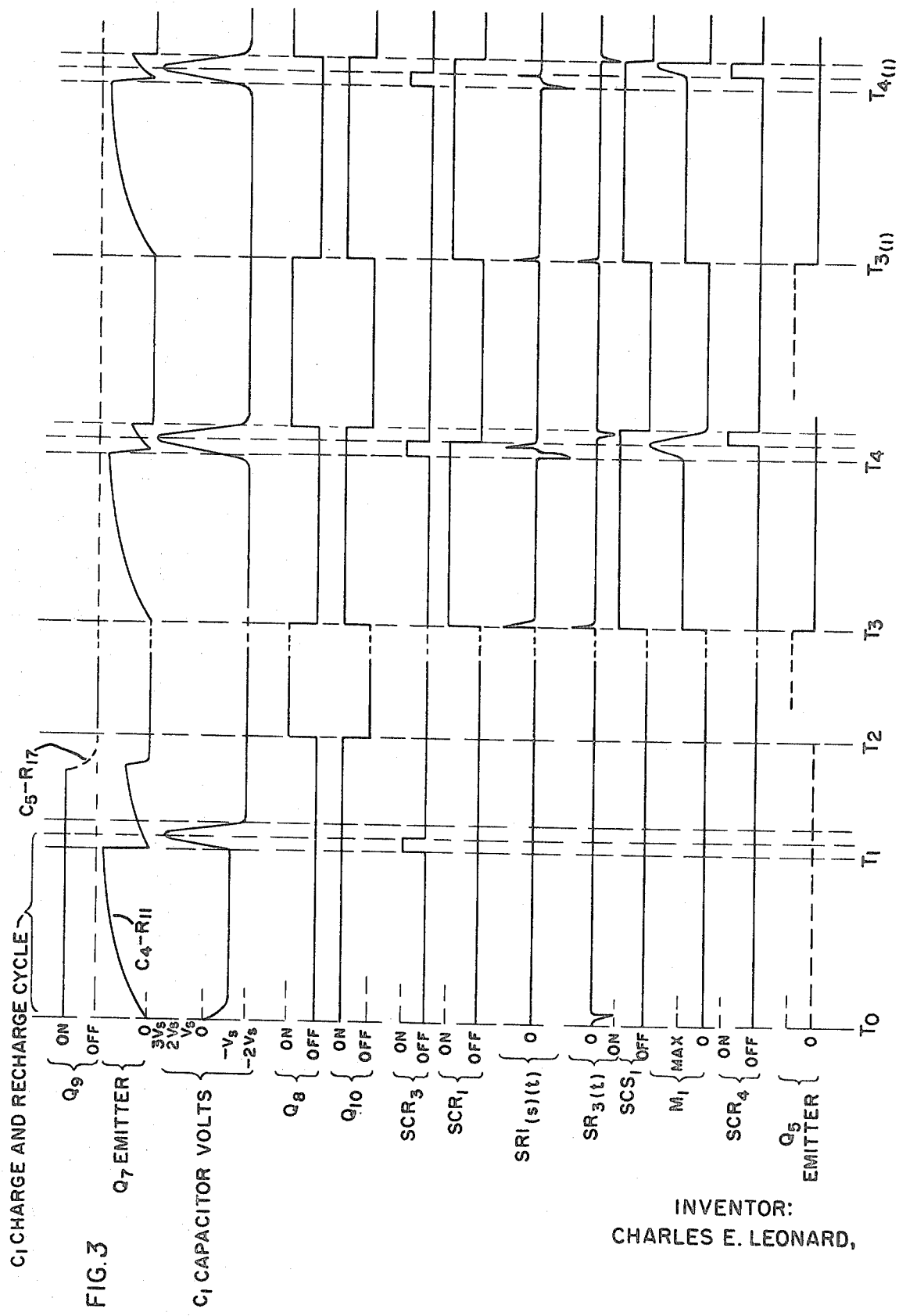

POWER AMPLIFIER CONTROL SYSTEM

RELATED APPLICATION

This application is a division of Ser. No. 633,872, filed Apr. 26, 1967.

BACKGROUND OF THE INVENTION

This invention relates to a control system generally applicable to electrical apparatus requiring DC (or filtered AC) sources of electrical potential and, in particular, to such a system utilizing solid state controlled rectifier devices to control both the rate and direction of rotation of a DC drive motor.

DC motor and servo drive systems have been found to have increasing utility in land and airborne vehicle applications where AC power sources are somewhat limited. An example of recent developments in DC drive systems are transistorized servo or power amplifiers for unidirectional DC drive motor speed control. Control of both Azimuth and elevation positioning in turret-type weapon systems is also a requirement, as well as control of the rate and direction of movement of such turrets and other movable weapon systems. One way to control direction of movement in such systems is to utilize a bidirectional drive motor, e.g., a series-wound, split-field motor for both counterclockwise (CCW) and clockwise (CW) motor operation. Rate may then be controlled by regulating the timing and duration of the amplifier power pulses to the respective motor field windings, i.e., pulse frequency modulation control.

Problems arise, however, in the manner of controlling the shutting off or commutation of the power to the motor from the respective CCW and CW power supplying amplifier circuits. For example, transistor devices are quite sensitive to spurious or random signals induced in the apparatus by environmental conditions and relay contact or motor armature brush "bounce." The presence of such signals can operate to degrade the commutating pulse or signal, or result in commutation or conduction at the wrong time in the cycle. Together with reliability, circuit economy must be practiced, however particularly in airborne applications, such as helicopter weapon systems. To this end it is desirable that circuits be simplified with elements thereof doing "double duty" whenever possible. While several control system circuits are available for unidirectional control of a DC motor, such circuits leave something to be desired where precise, reliable bidirectional (reversible) DC motor control is required, together with control of the rate of operation in either direction.

Accordingly, it is a primary object of this invention to provide improved control apparatus employing solid state devices for supplying varying amounts of DC (or filtered AC power selectively and alternatively to separate, but related loads.

A more specific object of this invention is to provide improved circuit means utilizing solid state controlled rectifier devices for supplying power to a bidirectional DC drive motor to control both the direction of rotation and the rate of rotation of said motor in either direction.

Another object of this invention is to provide improved circuit means for reliably insuring properly timed and selective commutation of the power being supplied to an operational one of a pair of field windings of a bidirectional DC drive motor.

A still more specific object of this invention is to provide improved signal control circuit means in a power amplifier apparatus employing solid state devices for selective and properly timed triggering and "lockout" of one or more of such devices so as to insure "steering" of circuit generated commutating pulses to the appropriate amplifier motor power supplying device at the proper time.

SUMMARY OF THE INVENTION

In a disclosed form of my invention I provide a first pair of controlled rectifiers, each series connected across a source of electrical potential with one field of a series-wound, split-field DC drive motor. A pair of variable frequency unijunction transistor-oscillators are employed, together with a differential amplifier, to trigger one or the other of the first pair of rectifiers into pulse frequency modulated conduction, depending on whether the differential amplifier calls for CCW or CW motor operation. A first pair of saturable reactors are provided, in accordance with one feature of my invention, wherein each reactor has a primary winding in series with one of the first pair of controlled rectifiers and its associated motor winding. Commutating means to shut off the appropriate (i.e., conducting) controlled rectifier supplying motor power are also provided, including a capacitor, a first inductance and a diode, all series connected across the main circuit power source and arranged to charge the capacitor—initially—to a negative polarity at one terminal thereof. Connected across the capacitor are circuit means providing timed capacitor charge reversal including a single controlled rectifier having its cathode and anode, respectively, connected to said one and the other capacitor terminal, and the secondary windings of the pair of saturable reactors. Signal generating circuit control, lockout, and triggering means are also provided, including a normally free running unijunction transistor-oscillator operatively coupled to the single controlled rectifier for periodically causing the controlled rectifier to conduct to cause capacitor charge reversal to insure a properly timed commutation pulse.

A primary feature of the invention, as herein disclosed, are means operative to "steer" the capacitor discharge current—subsequent to charge reversal—to the conducting power supplying controlled rectifier, including a second pair of controlled rectifiers operatively connected between the charge reversal circuit means and the first pair of controlled rectifiers. Thus, if the CCW motor winding, for example, is operational the commutation pulse is "steered" through a path comprising—in series—said one capacitor terminal, the anode of one of the second pair of controlled rectifiers, its cathode, the appropriate motor winding to ground. This, in turn, impresses the now positive polarity of the capacitor, at the said one terminal, on the cathode of the conducting power controlled rectifier. Since the voltage level on the capacitor is now higher than the circuit power supply potential—due to the action of an inductance in the charge reversal circuit—the conducting controlled rectifier is back-biased into nonconduction.

In accordance with still other features of my novel circuit and apparatus, the two saturable reactor cores are "set" as a result of current in either of the motor windings. Using tertiary windings in the reactors, signals induced in the core by the "set" action are used to trigger the appropriate "steering" controlled rectifier into conduction. A third saturable reactor is also provided having primary windings in series with the respective motor winding power circuits, a secondary winding in the capacitor charging circuit and a tertiary winding. The third reactor core is alternatively "set" and "reset" to achieve timed lockout of the free-running and the pair of variable frequency unijunction transistor-oscillators by selective triggering of a solid state switching device operable on a signal from the third reactor to effectively deactivate the two variable frequency oscillators during the power pulse or capacitor discharge. Finally, I have incorporated circuit means, including still another inductor arranged to insure reliable commutation in the event the commutation capacitor is initially partially charged or subsequently fails to reverse bias the conducting power controlled rectifier on the first discharge pulse and also to minimize the chances that such commutation pulse will not be available after the application of power to the amplifier in the initial instance.

BRIEF DESCRIPTION OF THE DRAWINGS

The subject matter which I regard as my invention is set forth in the appended claims. The invention itself, together with further objects and advantages, will be perhaps better un-

BRIEF DESCRIPTION OF THE DRAWINGS

Figure 1:
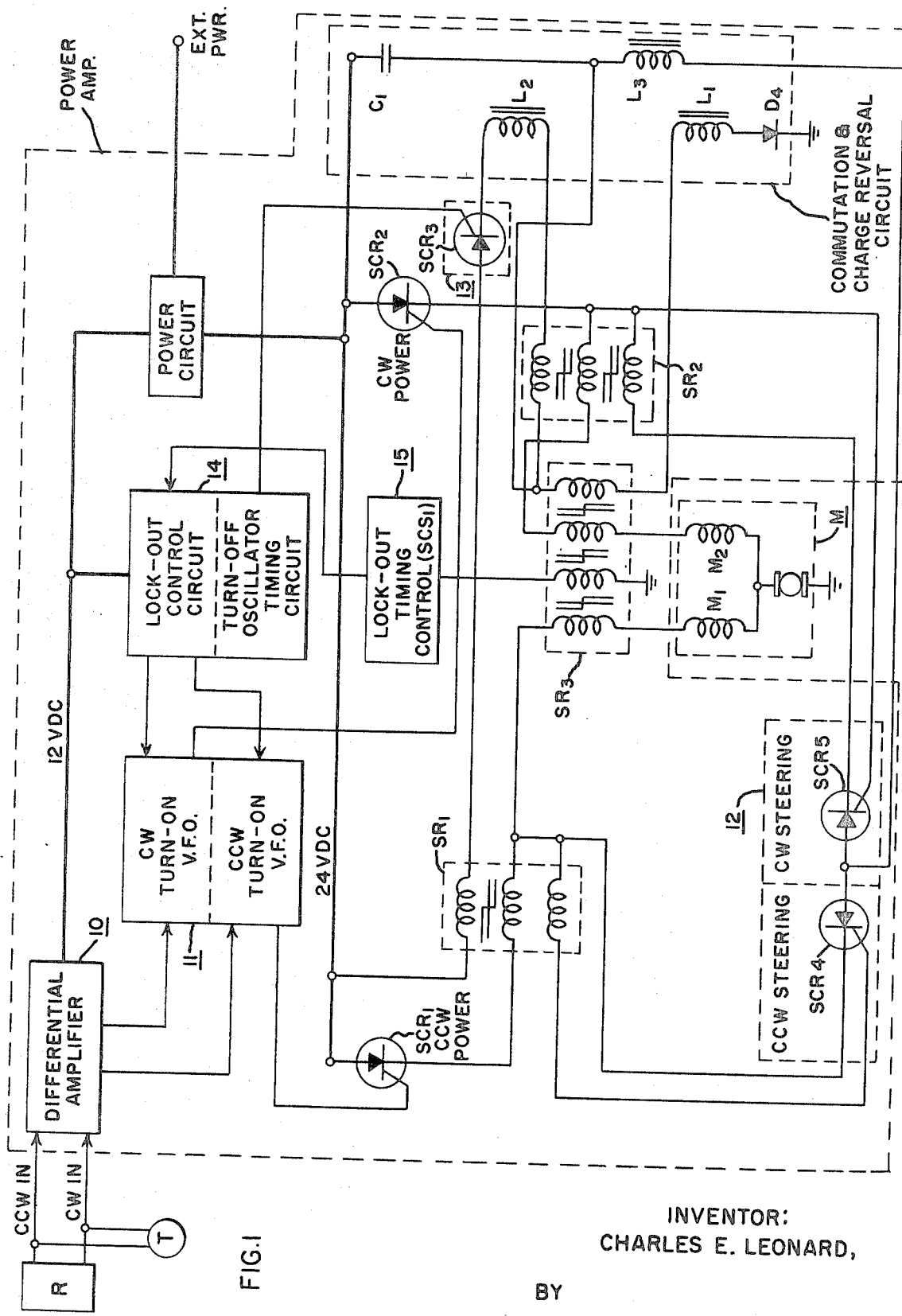

The subject matter which I regard as my invention is set forth in the appended claims. The invention itself, together with further objects and advantages, will be perhaps better understood in view of the following detailed description, when read in conjunction with the accompanying schematic drawings in which:

FIG. 1 is a combination block and partial schematic circuit diagram of an improved power amplifier and motor control system constructed according to my invention;

FIG. 2 is a full schematic circuit diagram of the apparatus of FIG. 1; and

FIG. 3 is a generalized time graph illustrative of the timed operation of the several components of the circuit of FIG. 2.

DESCRIPTION OF THE PREFERRED EMBODIMENT

FIG. 1 shows the improved circuit of my invention utilized with a split-field series wound turret motor M, although it will be understood that it may have equal utility in apparatus requiring alternately timed application of power of varying amounts from a DC or filtered AC source, to separate, but related circuit loads. The circuit disclosed will control direction of turret movement by excitation of the proper motor field $M_1$ or $M_2$ for counterclockwise (CCW) or clockwise (CW) rotation, respectively, of the motor, as well as control the speed of rotation in either direction. As indicated, the CCW and CW input signals are applied to the differential amplifier, indicated by the box at 10, from the operator of the equipment by use of a hand control R, having a rheostat or similar device, whereby movement in either direction, for CCW operation or CW operation, supplies a DC signal, which is compared to a system rate signal generated by known means, such as a gear tachometer T coupled to the motor M to produce an unbalance or error signal for the motor power portion of the circuit, hereinafter described in detail. This invention, shown as a rate servo amplifier, will work equally as well as a position servo if the tachometer is replaced by a position measuring device such as a synchronous control transformer (Selsyn). This would require a synchronous generator in the hand control and means for converting the error signal AC to DC. As further shown in FIG. 1, the differential amplifier 10 supplies signals, alternatively, to the "turn-on" circuit 11 comprising a pair of variable frequency unijunction transistor oscillators. The "turn-on" circuit controls operation of the motor power supplying devices, in this instance a pair of controlled rectifier devices $SCR_1$ and $SCR_2$ for CCW and CW powered operation, respectively. Commutation—for the powered motor operation—and charge reversal circuit means comprising a capacitor $C_1$ and a plurality of inductances $L_1$, $L_2$ and $L_3$ are also illustrated. An important feature of the invention is the provision of a steering circuit 12 for the commutation pulse, the steering circuit including a second pair of controlled rectifiers. Signal supplying and control means for selective and timed capacitor ($C_1$) charge reversal, triggering and timed lockout are indicated by the boxes at 13, 14 and 15. Finally, integral with the signal supplying means and the power supplying circuits are a plurality of saturable reactor devices $SR_1$, $SR_2$ and $SR_3$ for improved control of the operation of the steering and lockout circuitry.

As disclosed in detail in FIG. 2, the differential amplifier shown at 10 comprises four transistors $Q_1$, $Q_2$, $Q_3$ and $Q_4$ and their associated circuitry. With the wiper arm of the potentiometer centered a low voltage, e.g., 4—5 v. DC is present at each of input leads. Displacement of the arm downward (in the drawings) changes the voltage so as to raise the potential at the CCW input while lowering it at the CW input. Through operation of the power amplifier, as discussed in detail hereafter, the motor rotates in the CCW direction. The mechanically coupled tachometer T, however, generates at the same time a DC voltage proportional to the speed of rotation of the tachometer shaft, i.e., the motor. This voltage is impressed, through suitable feedback resistors, on the input terminals. That is, through use of the diodes on the tachometer terminals the feedback voltage on the lower terminal—positiveEQis grounded, while the feedback voltage on the upper terminal—negative—is applied to the CCW input. This lowers the CCW input voltage, reducing the frequency of the power pulse fed to power supplying device $SCR_1$. Operation is then stabilized at the value required to drive the power amplifier load at the constant speed dictated by the position of the hand control potentiometer.

Rotation of the wiper arm upward (in the drawing) results in the CW input voltage rising and the CCW input decreasing. This causes the negative feedback voltage from the tachometer T to be impressed on the CW input, resulting in stabilization, as before, of both speed and direction of rotation of the motor or load.

It will be understood, therefore, that transistors $Q_1$ and $Q_4$ are substantially nonconducting, i.e., a minute current is equally divided between the two transistors which are connected through diodes $D_1$ and $D_2$ respectively, to the CCW SIGNAL INPUT and the CW SIGNAL INPUT leads, in turn, connected to the respective ends of the potentiometer R. The NPN transistors $Q_1$ and $Q_4$ are biased in this balanced state by suitable current biasing means, such as resistors $R_1$ and $R_2$ in the base leads of $Q_1$ and $Q_4$, respectively, and $R_3$ and $R_4$ in the common-connected emitter lead circuit. $R_3$ may be adjustable to control amplifier sensitivity. The collectors of NPN transistors $Q_1$ and $Q_4$ are connected directly to the base leads of the respective PNP transistors $Q_2$ and $Q_3$ in the CCW and CW signal input channels. A marked increase of current in the collector circuit of either NPN transistor due to an increase in the appropriate input signal to the amplifier, as described above, will, in turn, cause a marked increase in current flow through the PNP collector circuit comprising, for $Q_2$, for example, common emitter resistor $R_5$ and the RC charging network including $C_2$ and $R_6$ and the $Q_2$ internal resistance. Likewise, an increase in the CW signal input would cause a marked increase in current flow through the collector circuit of $Q_3$, including common emitter resistor $R_5$ and a second RC charging circuit comprising $C_3$ and $R_7$ and the internal resistance of $Q_3$, Base lead resistors $R_8$ and $R_9$ are used to help establish operating levels in the PNP transistors $Q_2$ and $Q_3$. The CW or CCW power signal is therefore initiated in the power amplifier using the charging circuits established by the internal resistance of the respective PNP transistors $Q_2$ and $Q_3$ in series with their respective RC circuits $C_2$—$R_6$ and $C_3$—$R_7$.

Turning now to the variable frequency oscillator or "turn-on" signal generating portion of my novel control circuit, indicated by the box at 11, it will be seen that leads 21 and 22 will supply a signal indicating a need for power for CCW or CW operation—alternatively—of motor M. Indicated at $Q_5$ and $Q_6$ are a pair of unijunction transistor devices. Turning first to $Q_5$, or the CCW turn-on device, it is used as a "relaxation" oscillator to supply a series of pulses to "gate" or turn-on an appropriate solid state controlled rectifier power supplying device (SCR), as more fully described hereinbelow. To this end, the emitter lead of $Q_5$ is connected directly to the CCW signal initiating control circuit, at the junction of $C_2$, $R_6$ and the collector lead of $Q_2$. The Base No. 2 lead of $Q_5$ is connected in series, through lead 23, with the primary of a first signal coupling transformer $T_1$. Similarly, the Base No. 2 lead of CW variable frequency "relaxation" oscillator $Q_6$ is connected through lead 24 to the primary of a second signal coupling transformer $T_2$, while the emitter lead of $Q_6$ is connected to the CW signal modulating or control circuit, at the junction of $C_3$, $R_7$ and the collector lead of $Q_3$. In addition, the Base No. 1 leads of $Q_5$ and $Q_6$ are together connected to the cathode of a limiting diode $D_3$, and the lockout control circuitry, for purposes more fully described hereinafter.

Turning now to a description of the SCR devices employed in my novel and improved circuit for initially applying power to the motor field, it will be seen that the secondary of "pulse"

second controlled rectifier device $SCR_2$ connected through its gate and cathode leads 33 and 34, respectively, to the secondary of "pulse" transformer $T_2$. The anodes of each of the power devices $SCR_1$ and $SCR_2$ are connected to the main (B+) circuit power bus 36, in the case, 24 volts DC.

As can be seen in the FIG. 2 diagram, when $SCR_1$, for example, is in the conducting state, current to operate the motor flows from the 24 v. DC power supply bus, through the controlled rectifier cathode lead 38, the series-connected windings of saturable core devices, $SR_1$ and $SR_3$, hereinafter described in detail, the CCW motor field winding $M_1$, the motor armature and, thence, to ground. Similarly, if $SCR_2$ is conducting, the current path is through cathode lead 39, the series-connected windings of the saturable core devices $SR_2$ and $SR_3$, the CW motor field winding $M_2$, the motor armature and, finally, to ground. It will be appreciated, therefore, that power supplied to the motor is pulse frequency modulated by use of the variable frequency oscillator circuit 11 and its associated signal supplying and control circuitry, as will now be described in detail.

As explained above, once the proper signal is applied to the gate lead of a controlled rectifier device, such as $SCR_1$, it will continue to conduct even though the gate or bias signal is removed. Thus, a signal must be provided to commutate or cutoff the conducting SCR device—and the supply of power to the load—which signal must have the proper timing and duration or otherwise control of motor M will be lost. Control is particularly important and necessary in the case of bidirectional motors since power must not be applied to both fields at the same time as this could cause motor stall or even irreparable damage to the motor. It will be recalled that the emitter lead of $Q_5$ is connected to an RC charging circuit at the collector lead of PNP transistor $Q_2$. When the collector current of $Q_2$ suddenly rise, capacitor $C_3$ starts to charge at a rate determined by the value of resistor $R_6$, the internal resistance of $Q_2$, and $R_5$. When the peak-point voltage of unijunction transistor $Q_5$ is reached, the input impedance of the device—normally high—suddenly drops. Capacitor $C_3$, which has charged with its positive side on the emitter connection, suddenly discharges through the unijunction Base No. 2 lead, line 23 and the primary winding of $T_1$, to ground. The signal on the primary of $T_1$ appears as a signal or pulse on the secondary with a polarity such as to turn on or "gate" $SCR_1$. It will be appreciated, therefore that the power supplied to the motor field winding $M_1$ is regulated by signals or power pulses generated by the variable frequency oscillator $Q_5$, i.e., the motor will be pulse frequency modulated with its speed in the CCW direction depending on the periodic application of power as controlled by the time constant of $C_2$, $R_6$ and $Q_2$. It should be noted that the internal impedance (resistance) of a transistor is inversely proportional to the base current. Therefore, when a base current signal is applied to $Q_2$, for example, the internal resistance will decrease in proportion to the magnitude of the base signal; thereby increasing the charging rate of $C_2$—in the collector circuit—which in turn increases the oscillating frequency of unijunction transistor $Q_5$. Commutation control is thus very important to the desired operation of the CCW and CW power "switching" controlled rectifier devices.

I will now describe how commutation control is assured in my novel circuit and apparatus. It will be seen that when power is first applied to the amplifier main bus 36 the relatively large commutating capacitor $C_1$ will begin to charge towards 24 volts since its lower terminal is connected to ground through leads 41—43, a secondary winding of the saturable core device $SR_3$, lead 44, a relatively large inductance $L_1$, and a blocking diode $D_4$, all in series. The energy stored in the inductance $L_1$ during charging, however, is returned to the capacitor in the form of increased voltage. That is to say $C_1$ charges to a voltage greater than the supply voltage. $L_1$ (and the $SR_3$ secondary, to a lesser extent) will thus drive the lower terminal of commutating capacitor $C_1$ below ground potential, diode $D_4$ blocking any reversal of current flow through $L_1$ which would tend to decrease the charge on $C_1$. To fully insure an adequate commutation charge I have also provided a "gated" or switched commutation capacitor charge reversal circuit including still another controlled rectifier device $SCR_3$ and a second inductance $L_2$. Operation of this circuit is controlled by a free-running, so-called "turn-off" or timing oscillator in the form of a unijunction transistor $Q_7$ and its associated frequency control and lockout circuitry, indicated at 14, in FIG. 1. As seen in the drawing, the Base No. 1 lead of $Q_7$ is connected through limiting diode $D_5$ to a Zener supply bus 45. Bus 45 is connected to a regulating circuit across the main supply, i.e., to the junction of dropping resistor $R_{10}$ and the Zener diode $Z_1$ cathode, $Z_1$ is selected so as to provide a voltage on line 45 of approximately one-half of the main supply line voltage, or 12 v. DC. The Base No. 2 lead of $Q_7$ is connected through the line 45 to the primary of a third signal coupling "pulse" transformer $T_3$. Finally, the emitter lead of $Q_7$ is connected to the junction of a charging capacitor $C_4$, the collector lead of an NPN lockout transistor $Q_8$, and a dropping resistor $R_{11}$, the other end or $R_{11}$ being connnected to the 12 v. DC Zener supply line 45. The other terminal of $C_4$ and the $Q_8$ base lead is connected through line 48 to a voltage divider network in the so-called lockout circuit. The voltage divider network is connected between ground and the primary supply line and is comprised of series-connected resistors $R_{12}$, $R_{13}$, $R_{14}$, and $R_{15}$. Normally, $Q_8$ is biased "on" and is conducting through its grounded emitter lead by reason of the voltage drop across $R_{12}$ at the junction of $R_{12}$ and $R_{13}$ (the other end of $R_{12}$ being at ground), which is applied through line 48 to the base of $Q_8$. While NPN transistor $Q_8$ is conducting, it will be apparent the capacitor $C_4$, in the emitter circuit of unijunction transistor oscillator $Q_7$, is shorted or locked out. If $Q_8$ is turned "off," however, by removing the bias voltage from the base lead line 48, capacitor $C_4$ will charge through $R_{11}$ in the collector circuit of $Q_8$. Each time $C_4$ charges to the peak-point voltage of the unijunction transistor $Q_7$, its internal impedance will suddenly drop, allowing $C_4$ to discharge through the Base No. 2 lead, line 46, and the primary of $T_3$ to ground. This will result in a pulse on the secondary of transformer $T_3$ of the proper polarity to trigger the controlled rectifier device $SCR_3$ for $C_1$ charge reversal. That is to say, the output of the timing or "turn-off" oscillator $Q_7$ is connected through $T_3$ by leads 50 and 51 to the gate and cathode, respectively, of the "-switching" device $SCR_3$ which, as now described in detail, is utilized to insure the proper commutating pulse is supplied by $C_1$ to the power devices $SCR_1$ and $SCR_2$. It will be appreciated therefore, that $Q_7$ is a free-running oscillator supplying a series of pulses at desired intervals to a commutating circuit, except when locked-out by $Q_8$ and its associated circuitry.

As shown, $SCR_3$, normally nonconducting, is connected to the main power supply bus 36 through a secondary winding of the saturable core device $SR_1$ connected to the anode of $SCR_1$, through line 54, $SR_1$, it will be recalled, has a primary winding in series with CCW power switching or control device $SCR_1$. The cathode of $SCR_3$ is connected to the junction (line 51) of one side of the secondary of $T_3$ and the second inductance $L_2$. The other side of $L_2$ is, in turn, connected through line 55 to one side of the secondary winding of saturable core device $SR_2$. $SR_2$, as stated above, has a primary winding connected in series, through line 39, to the cathode of the CW power switching or control device $SCR_2$. The other side of the $SR_2$ secondary winding, i.e., the side opposite $L_2$, is connected through line 58 to the junction of the secondary winding of $SR_3$ with a third inductance $L_3$ and the lower, or normally negative (−), terminal of $C_1$, through lines 43 and 42—41, respectively.

It will be apparent, after the initial application of circuit power through bus 36 and subsequent to the initial charging cycle of $C_1$, that when $SCR_3$ is turned "one" by a trigger pulse from $T_3$, capacitor $C_1$ will attempt to discharge through the "loop" comprising $L_2$, $SR_2$, $SCR_3$ and the $SR_1$ secondary. The charge reversal current path thus initially consists of bus 36 (at the upper or——at this point—positive terminal of $C_1$), the secondary winding of $SR_1$, $SCR_3$, inductance $L_2$, line 55, the secondary winding of $SR_2$, and lines 42 and 41 to the lower terminal of $C_1$. The energy stored in $C_1$ is thus transferred to $L_2$ and thence back to $C_1$—charging it with reverse polarity, i.e., the lower terminal is now positive. At the end of this charge reversal cycle, therefore, $SCR_3$ will be reverse-biased and will revert to its blocking state—preventing the reverse flow of current through inductor $L_2$. At this point in time, since both controlled rectifier devices $SCR_4$ and $SCR_5$—discussed in detail hereinbelow—are nonconducting, the other discharge path to ground for $C_1$ is through the $SR_3$ secondary, the large inductance $L_1$, and $D_4$. Since, however, the peak voltage applied to $L_1$ will be approximately twice the supply voltage, the peak current will be at least twice the initial charging current. Thus, the energy stored in $L_1$ will be transferred back to $C_1$ as increased voltage at the end of this second charging cycle, i.e., as the charge on $C_1$ again reverse. The charge on $C_1$ will now be such as to insure commutation. That is to say, a partial charge on $C_1$ due, for example, to partial discharge when power is removed from line 36 by external switching means, or relay contact or switch "bounce," will be avoided by assuring that the commutation charge is at least 2 or 3 times the supply voltage by reason of the multicycle charge reversal described herein.

Another feature of the circuit of my invention is means to control the free-running oscillator $Q_7$ to insure the proper timing of the charge reversal cycle just described, as well as providing that the charge on $C_1$ achieves the desired potential.

It will be recalled that the voltage drop across $R_{12}$ of network 30 normally operates to bias $Q_8$ to conduct, thus locking-out free-running unijunction transistor $Q_7$. Referring again to the schematic drawing of the circuit, it will be observed that I have provided a "lockout sensing" circuit comprising the grounded emitter NPN lockout sensing transistor $Q_9$ and its associated current impeding devices. As shown, the $Q_9$ emitter lead is grounded and the base lead is connected to one side of a coupling resistor $R_{16}$. The other side of $R_{16}$ is connected to the junction of a resistor $R_{17}$ and one terminal of a capacitor $C_5$. The other, or upper, terminal of $C_5$ and the other side of $R_{17}$ are, respectively, connected across the Zener line 45 and ground to provide an RC charging network. On the other hand, the collector lead of $Q_9$ is connected to the junction of the upper end of $R_{13}$ (i.e., the opposite end of the $R_{13}$—$R_{12}$ connection) and the lower end of $R_{14}$, in the aforementioned voltage divider network 30. The collector lead of $Q_9$ is also connected to the lockout timing circuit 15, at the anode of controlled switching device $SCS_1$, through line 60, for a purpose hereinafter fully described in detail.

It will be apparent that as power is initially applied to the disclosed amplifier circuit and apparatus, the lower terminal of $C_5$ will initially be at the Zener line potential and, thereafter, approach ground potential as $C_5$ charges through resistor $R_{17}$ towards ground potential. $Q_9$ will conduct by reason of a bias signal applied to its base lead through coupling resistor $R_{16}$ until the lower terminal of $C_5$ approaches ground potential. It will be noted that the current path through $Q_9$ includes $R_{14}$ and $R_{15}$ of the voltage divider network and that, in effect, $R_{13}$ and $R_{12}$ are short circuited. When $C_5$ has fully charged, lockout sensing transistor $Q_9$ will shut off due to the lack of the proper bias signal through $R_{16}$. This removes the short circuit across $R_{13}$ and $R_{12}$. As previously described, the presence of a signal potential across $R_{12}$, which will now occur, will bias $Q_8$ to conduct, in turn, shutting off the free-running oscillator $Q_7$ since its charging capacitor $C_4$ is now short circuited. The charging period of the RC circuit comprised of $C_5$ and $R_{17}$ in the $Q_9$ base circuit is chosen to be greater than two cycles of oscillator $Q_7$, thus ensuring the desired cycling of the commutating capacitor $C_1$ charge reversal operation described hereinabove.

During the initial $C_1$ charging cycle period, including the charge reversal cycles, it will be observed that as $Q_9$ is conducting there will be an increased current flow through the voltage divider network resistors $R_{14}$ and $R_{15}$ in the $Q_9$ collector circuit. I have taken advantage of this to provide means to insure that the power modulating variable frequency oscillators $Q_5$ and $Q_6$ cannot operate so as to switch on either power supplying control rectifiers $SCR_1$ or $SCR_2$ until the completion of the charge reversal cycles described above. That is to say, the junction of the lower terminal of $R_{15}$ and the upper terminal of $R_{14}$ is connected directly to the base lead of a PNP transistor $Q_{10}$. The emitter lead of $Q_{10}$ is connected directly to the primary supply bus 36 and the collector is connected, through line 62, to the junction of the cathode of the limiting diode $D_3$ and the common Base No. 1 leads of $Q_5$ and $Q_6$. Thus, diode $D_3$ is across the 12 v. DC Zener supply line and the Base No. 1 junctions of $Q_5$ and $Q_6$, and is, in effect, paralleled by the additional lockout transistor $Q_{10}$ across the common Base No. 1 connection and the main 24 v. DC supply bus. Accordingly, throughout the initial $C_1$ charge and charge reversal cycles, described above, $Q_{10}$ is biased "on" by the voltage divider network signal, which in turn, places approximately 24 v. DC on the Base No. 1 leads of $Q_5$ and $Q_6$. This raises the firing point of each transistor above the Zener supply line voltage and $Q_5$ and $Q_6$ are "locked-out" since $C_2$ and $C_3$ are connected through transistors $Q_2$ and $Q_3$, respectively, and the common resistor $R_5$ to the Zener line and, thus, cannot charge above 12 v. DC. Diode $D_3$ prevents $Q_{10}$ from short circuiting the Zener dropping resistor $R_{10}$, thus protecting $Z_1$ and $Q_{10}$ itself.

It is known that certain electrical devices, such as transistors, are sensitive to relatively small voltage changes when utilized in circuit environments conductive to the creation of spurious signals. Examples of such environments are where transistors are used in switching circuits, in connection with relay contacts, or in conjunction with motors wherein motor armature brush "bounce" may generate a false "-sensing" signal. In my novel bidirectional variable speed DC motor control amplifier circuit and apparatus I therefore provide means to permit the known advantages of these solid state devices over other devices, such as electron tubes, to be realized without these attendant disadvantages.

To explain, the circuit includes what may be termed a "current actuated priority lockout" arrangement utilizing a semiconductor controlled switch device $SCS_1$ (with its associated current blocking and limiting devices) in combination with the saturable core device $SR_3$. $SR_3$, it will be recalled, has two primary windings, of which respective ones are in series with power $SCR_1$ and power $SCR_2$ and a secondary winding in the initial $C_1$ charging circuit. $SR_3$ also has a tertiary winding across the cathode-gate and cathode leads of $SCS_1$. As shown, the anode and cathode of $SCS_1$ are parallel-connected with lockout sensing NPN transistor $Q_9$. $SCS_1$ is arranged to be switched "on" by the initiation of power output current flowing in either motor field $M_1$ or $M_2$ and switched "off" by the commutation pulse current, initiated by $C_1$, at the end of each power pulse, as now explained in detail.

As is known, saturable core or saturable reactor devices operate by hysterisis action induced by current flow through the inductor (winding) portion of the device. Multiwound saturable reactors, so-called may be utilized to control other electronic devices by reason of the fact that the "square hysterisis loop" characteristics of the core material may be chosen to provide signals of different polarity. That is, in saturable core device $SR_3$, for example, if the net magnetomotive force (MMF) produced by current flow in either or both of the primary—and the secondary—windings is such as to drive the core further into saturation, there will be no output in the tertiary winding. If, on the other hand, the net MMF is in such a direction as to reverse the state of saturation, the tertiary will develop an output voltage or signal, the polarity of which depends on the direction of the magnetization state reversal. The two magnetization states will hereinafter be referred to as state "zero" and state "one." Magnetization state reversal from state "zero" to state "one" has been described heretofore as core flux "setting" and magnetization state reversal from state "one " to state "zero" as core flux "resetting." It is this type of signal that is applied to $SCS_1$ through the tertiary winding of $SR_3$ to switch $SCS_1$ from its nonconducting to its conducting state, and vice versa, in the disclosed circuit arrangement. $SCS_1$ is also provided with suitable decoupling and limiting diodes, such as indicated at $D_6$ and $D_7$, as well as coupling or current limiting resistors $R_{18}$ and $R_{19}$ which are in the cathode-gate lead of $SCS_1$, and are series connected, through line 64, to one side of the tertiary winding of $SR_3$. The other side of the $SR_3$ tertiary is grounded, as is the cathode lead of $SCS_1$. As also shown in the drawing the two primary windings of saturable reactor $SR_3$ are each connected between the motor windings $M_1$ and $M_2$ and the primary windings of $SR_1$ and $SR_2$ by lines 66—67 and 68—69, respectively.

Accordingly, when current flows in the large inductor $L_1$, during the initial charging cycle of $C_1$, the current path is through the secondary winding of saturable reactor $SR_3$, as described above. This results in the $SR_3$ core material being either maintained in or "reset" to its "zero" state. However, when current flows in either of the primary motor power circuits ($SCR_1$ or $SCR_2$ conducting) the $SR_3$ core will be "set" to its "one" state. This will cause a voltage or signal to appear across the tertiary of $SR_3$, which will be of a polarity such as to cause $SCS_1$ to conduct, which results in the locking-out of unijunction transistors $Q_5$ and $Q_6$ in the variable frequency "turn-on" oscillator circuit 11, and the release of free-running oscillator $Q_7$. At commutating capacitor $C_1$ discharge it should be noted that current flow from $C_1$ follows two parallel paths, namely: (1) through lines 41—43, the secondary winding of $SR_3$, line 44, large inductor $L_1$, diode $D_4$, to ground and (2) through inductor $L_3$, line 70, $SCR_4$ (or $SCR_5$), line 80 (or 81), a primary winding of $SR_3$, the load or operational motor winding, to ground. Since, essentially the $SR_1$—$SR_3$ windings have negligible inductance, it will be apparent that the duration of current flow in these two circuits will be controlled respectively, by the relative values of the $L_1$ inductance, and the $L_3$—$M_1$ (or $M_2$) combined inductance. The relative value of the primary inductors i.e., $L_1$ and $L_3$, are therefore chosen so that the capacitor discharge current will persist in the $SR_3$ secondary after the current in the appropriate $SR_3$ primary circuit has decreased to zero. When the magnetomotive force (MMF) produced by the current through either one of the $SR_3$ primary windings drops below the MMF produced by the current flowing in the secondary of $SR_3$, therefore, the core material of saturable reactor $SR_3$ will reset from its "one" to its "zero" state. This, in turn, results in another signal in the tertiary winding of $SR_3$ of a polarity such as to cause $SCS_1$ to revert to its blocking state, causing $Q_8$ to conduct, thus shutting down the free-running oscillator $Q_7$, as described above.

A primary feature of the improved solid-state, bidirectional amplifier control circuit of my invention, will now be described in detail. At number 12 in the drawings, I have indicated means I chose to call a "current-actuated commutation steering circuit." Essentially this comprises a pair of controlled rectifiers $SCR_4$ and $SCR_5$, which, when utilized in the unique manner described herein in conjunction with the circuit components already identified, will insure that the commutation pulse or signal is "steered" to the proper controlled rectifier power supplying device, $SCR_1$ or $SCR_2$, i.e., the one that is conducting. A further benefit of this feature of my improved circuit is that since the two controlled power rectifiers $SCR_1$ and $SCR_2$ are never required, or, in fact, permitted to conduct simultaneously, circuit economy is realized by use of a single commutation capacitor and "steering" its commutation pulse to the appropriate power SCR.

As will be observed from the drawing, the $L_3$ terminal at line 70 (i.e., opposite the $L_3$—$C_1$ connection) is connected to the junction of the $SCR_4$ and $SCR_5$ anode leads. The cathode of $SCR_4$ is connected through lines 74 and 80 to the CCW power line 67, at the junction of line 67 with the $SR_1$ primary winding. The gate and cathode leads of $SCR_4$ are also connected, through lines 72 and 74, respectively, to the tertiary winding of the saturable reactor device $SR_1$. Likewise, the cathode lead of $SCR_5$ is connected through lines 76 and 81 to the CW power line 69, at the junction of line 69 and the primary winding of $SR_2$. The respective cathode and gate leads of "steering" device $SCR_5$ are also connected to the tertiary winding of the saturable reactor device $SR_2$, through lines 76 and 78.

Accordingly, whenever current flows through the CCW motor field winding $M_1$, for example, the core of $SR_1$ will be "set" from its "zero" state to its "one" state, or maintained in the latter state. If core "set" occurs, a signal or trigger pulse will appear across the tertiary of $SR_1$ and, in turn, be applied to the gate of the "steering" device $SCR_4$ to turn it on. However, since the anode of $SCR_4$ is at a negative potential, with respect to its cathode, by reason of the polarity of $C_1$, at this point in time, $SCR_4$ will not conduct. Each time there is a commutating capacitor charge "reversal," the MMF caused by current flowing in the primary of $SR_1$ and the resultant net MMF will cause the core of the saturable reactor $SR_1$ to be "reset" to its "zero" state. The polarity of the output signal induced on the tertiary winding of $SR_1$ thereby will negatively bias the gate of $SCR_4$ causing no change in its state of nonconduction. However, when the MMF produced by the commutation capacitor charge reversal current in the secondary of $SR_1$ subsequently falls below the MMF produced by the power line current in the $SR_1$ primary, i.e. as the capacitor approached its reversed polarity state, the $SR_1$ core will be "set" to its "one" state. The polarity of the resultant output which now appears on the tertiary of $SR_1$ will be such as to trigger $SCR_4$ into conduction, since the anode of $SCR_4$ is at this moment positive with respect to its cathode by reason of the changed polarity of $C_1$. This "steers" the subsequent discharge of $C_1$ to the appropriate power line. Since, at this instance, there is no power current flowing in the primary of $SR_2$, $SCR_5$ will not be triggered into conduction. The commutating capacitor, it will be recalled, is at this point charged to 2 or 3 times the primary power source potential. Accordingly, when the capacitor discharge pulse or commutating signal current is "steered" to the $M_1$ (CCW) motor field winding power line, it will take over as the primary source of motor current. Because $C_1$ was charged above source potential, $SCR_1$ is thus reverse-biased, and will revert to its blocking state. This accomplishes commutation of the frequency modulated motor power pulse.

Recapitulating operation of the disclosed power amplifier circuit, as power is initially applied 24 volts DC appears on the primary supply bus 36. Commutation capacitor $C_1$ starts to charge initially to about twice the supply voltage. Likewise capacitor $C_4$ in the emitter circuit of $Q_7$ is charging and shortly reaches the peak "breakover" voltage of the unijunction transistor, which triggers the free-running oscillator supplying a pulse to trigger $SCR_3$, causing the first charge reversal of $C_1$. This continues as long as $Q_7$ is free-running. However, it will be recalled that as primary power is applied, $C_5$ starts to charge through $R_{17}$ and, after the desired time interval for full commutation capacitor charging has taken place, $C_5$ operates to remove the bias voltage on $Q_8$, causing $Q_8$ to conduct which results in locking-out $Q_7$ by causing a short across $C_4$. During the initial charging period, conduction of lockout sensing transistor $Q_9$ has caused PNP lockout transistor $Q_{10}$ to conduct and render the variable frequency oscillator circuit 11 inoperative. However, when $C_1$ is fully charged and ready to supply a commutating pulse, $Q_{10}$ is itself rendered inoperative and the unbalance signal supplied through the differential amplifier circuit 10 takes over to cause $Q_5$ (for $Q_6$) to pulse frequency modulate current flow through the load, by operation of the appropriate controlled rectifier power supplying device $SCR_1$ (or $SCR_2$). In conjunction with operation of the solid-state controlled power rectifiers, $SCS_1$ and the multiwound saturable core device $SR_3$ have assured that when current does flow in either load, due to the turning on of either power $SCR_1$ or power $SCR_2$ that the variable frequency oscillators $Q_5$ and $Q_6$ will be shut down and, simultaneously, free-running oscillator $Q_7$ released to start the commutation sequence. Thereafter, when the commutation capacitor discharge has been "steered" to the appropriate conducting power SCR, to shut it off, the current in $L_1$ will "reset" the $SR_3$ core to cause $SCS_1$ to shut off, which, in turn locks out $Q_7$ and releases $Q_5$ or $Q_6$ to pulse the power rectifier $SCR_1$, or $SCR_2$ again.

Like $SR_1$, saturable reactor device $SR_2$, it will be recalled, has a primary winding in series with power rectifier device $SCR_2$, a secondary winding in series with $SCR_3$ and $L_2$ (in the commutation capacitor charge reversal circuit), as well as a tertiary winding connected by lines 76 and 78 between cathode and gate leads of the controlled rectifier "steering" device $SCR_5$. Accordingly, an output signal on the tertiary winding of $SR_2$ will operate to bias $SCR_5$ to conduct at the appropriate point during which the power device $SCR_2$ is conducting, in the same manner as $SR_1$ operated to bias $SCR_4$ into conduction. When triggered by $SR_2$, $SCR_5$ "steers" the commutation pulse through lines 76, 81 and 69, a primary winding of $SR_3$, line 68, and the CW motor winding $M_2$. $SCR_2$ will now be back-biased by reason of the signal appearing on its cathode through the $SR_2$ primary. By the same token, since no motor current is flowing through the primary of $SR_1$, at this instant, the $SR_1$ core will remain "reset" in its "zero" state during commutating capacitor charge reversal and $SCR_4$ will remain in its blocking state throughout the capacitor $C_1$ discharge. In this unique manner I provide means whereby the commutating capacitor discharge pulse will be "steered" to the load through which power current is flowing to back-bias the appropriate power supplying controlled rectifier device $SCR_1$, or $SCR_2$, as the case may be.

Referring to FIG. 3, the sequence of operation of various circuit components is depicted on a generalized time graph, it being understood that certain of the waveforms have been compressed or expanded for clarity. Time $T_0$ on the diagram is assumed to be when power is initially applied to the amplifier. Accordingly, the lower terminal of $C_1$ goes to $-v_s$ due to the action of $L_1$, as described above. The core of $SR_3$ is "reset" causing a signal at the tertiary thereof which is ineffective at this time. At this point the RC circuit on the $Q_7$ emitter, comprising $C_4$ and $R_{11}$, is charging towards its peak and $Q_9$ is conducting since $C_5$ has yet to charge through $R_{17}$ and the required bias voltage is still being applied through coupling resistor $R_{16}$. At time $T_1$, the unijunction transistor-oscillator $Q_7$ suddenly conducts, as indicated by the sudden voltage drop at its emitter lead. This triggers $SCR_3$, which reverses the polarity on $C_1$. As stated above, through the reenforcing action of $L_1$, and $L_2$, $C_1$ is charged to a potential of about 2 or 3 times the supply voltage; thus the lower terminal of $C_1$ is indicated as approaching $-2 v_s$. This feature of the circuit of my invention will avoid the situation that has existed heretofore where partially charged commutating capacitors have not been effective to achieve shutoff of controlled rectifiers with the desired degree of reliability.

Immediately after discharge, $C_4$ will attempt to recharge, to continue cycling $Q_7$, but the lower terminal of $C_5$ is now approaching ground potential, so the bias signal drops off the base of $Q_9$ and it ceases to conduct. At time time, ($T_2$), the short is removed across $R_{12}$ and $R_{13}$, in the voltage divider network in circuit 30, and $Q_8$ conducts, cutting short the charging cycle of the $C_4$, $R_{11}$ RC circuit. $Q_{10}$ which had been conducting, also shuts off. The amplifier is now ready to receive an unbalance signal indicating a desire for CCW, or conversely, CW operation. The graph of the $Q_5$ (CCW) variable frequency transistor-oscillator is illustrative of how the circuit operates in such instance. Thus, it will be seen that the emitter voltage on $Q_5$ is gradually rising under the control of the RC time constant comprising the capacitor $C_2$, fixed resistor $R_6$ and the varying internal resistance of $Q_5$—the latter being dependent on the strength of the unbalance signal, as stated hereinabove. When $Q_5$ triggers at $T_3$, it will be observed that $SCR_1$ turns "on" and the load voltage in $M_1$ rises to its normal peak as the motor operates. The resultant $SR_3$ primary current "sets" the core and a signal appears on the $SR_3$ tertiary, which triggers $SCS_1$ into conduction. This, in turn, results in $Q_{10}$ conducting, to lockout $Q_5$, and, at the same time, $Q_8$ is shut off. This allows $C_4$ to start to charge again through $R_{11}$ to trigger $Q_7$. When $Q_7$ triggers at $T_4$, the commutation cycle occurs, as follows:

As the $Q_7$ emitter drops sharply, a pulse appears on the secondary of $T_3$ and triggers $SCR_3$. Immediately, the $C_1$ voltage starts to rise towards its maximum of about $3 v_s$. The core of $SR_1$ is "reset" by reason of the charge reversal current through its secondary—as well as through the $SR_2$ secondary and $L_2$. When the $C_1$ voltage nears its peak positive potential, the MMF induced by the charge reversal current is less than the MMF induced by load current in the $SR_1$ primary, and the core of $SR_1$ is "set." At this point $SCR_3$ is back-biased into nonconduction by the positive polarity on the lower terminal of $C_1$. At this point, the $SR_1$ tertiary has applied a signal of such polarity as to trigger "steering" $SCR_4$, into conduction, which results in the capacitor discharging through the operational motor winding to ground. At this point, there will have been a sudden rise in the load ($M_1$) voltage, as shown. The voltage at the lower terminal of $C_1$ also back-biases $SCR_1$ into nonconduction since this voltage is—initially—approximately 3 times the supply voltage ($v_s$). The increased charge on the commutating capacitor $C_1$ will actually overdrive the conducting motor power controlled rectifier $SCR_1$ or $SCR_2$, into its blocking state—as well as $SCR_3$. As the capacitor voltage passes down through zero, however, the drop in primary current through $SR_3$ is faster than the drop in the secondary since, as discussed above, the $L_1/L_3$ ratio is chosen to cause the secondary current to persist after the primary current. This causes a "reset" of the $SR_3$ core, resulting in a signal on the tertiary of $SR_3$ such that $SCS_1$ is caused to revert to its blocking state. At this point, $Q_8$ is released to conduct, effectively locking out $Q_7$ while $Q_{10}$ is inactivated so as to release $Q_5$ (and $Q_6$) to the control of the unbalance signal. Depending on the presence—or absence—of an unbalance signal and its strength, the $Q_5$ emitter voltage will be at some point on its way to the peak-point voltage required to fire the variable frequency transistor-oscillator $Q_5$ (or $Q_6$) at $T_3(1)$.

It should be emphasized that a feature of my novel circuit arrangement is that in the situation where the load current is not commutated by the $C_1$ capacitor discharge there will be no "reset" of $SR_3$ and no signal applied to $SCS_1$ to shut it off. Hence, $SCS_1$ continues to conduct allowing a second (or third) charging cycle at the $Q_7$ emitter—since $Q_7$ is normally free-running. This will insure that the next one or two discharge pulses will achieve commutation at which time the load current—and its resultant MMF—will then be low enough to permit $SR_3$ "reset" to occur.

Although a particular circuit arrangement of the invention has been shown and described, it will be understood that other embodiments and modifications as will occur to those skilled in the art without departing from the scope and spirit of the invention are intended to be covered by the claims appended hereto.

What I claim as new and desire to secure by Letters Patent of the United States is:

I claim:

1. A power amplifier improved circuit means for providing commutation voltage in excess of the amplifier power supply voltage for improved pulse frequency modulation of motor power comprising:
   a commutating capacitor;
   a diode;
   a first inductance connected between one terminal of said capacitor and the anode of said diode, said capacitor, first inductance and diode being serially connected across said power supply whereby said commutating capacitor is charged directly from the power supply without any capacitor pulse flowing through the load;
   means in parallel circuit relationship with said capacitor for periodic charge reversal thereof including a controlled rectifier and a second inductance, said controlled rectifier having a cathode element operatively series-connected through said second inductance to said one terminal of said capacitor and an anode element operatively connected to the other terminal of said capacitor; and triggering circuit means coupled to said controlled rectifier and normally operable to cause said controlled rectifier to periodically conduct, whereby the resultant unidirectional current is cyclical through said second and then said first inductance, the ratio of said first to said second inductance being selected so that said inductances cooperatively raise the potential of said capacitor to substantially 3 times said power supply potential thereby to enhance commutation.

2. Circuit means according to claim 1 wherein said triggering circuit means includes a normally free-cycling transistor-oscillator operatively connected to the control element of said controlled rectifier to supply a regular series of trigger pulses thereto, and lockout circuit means connected to said oscillator, and lockout circuit means being operable for a predetermined period on the initial application of power to the amplifier to insure at least two operative cycles of said oscillator, wherein during said predetermined period the polarity at said one commutating capacitor terminal is reversed at least twice.

3. Circuit means according to claim 2 wherein said triggering and lockout circuit means further include a first resistance-capacitance charging network operatively connected to said transistor-oscillator to trigger same at predetermined intervals, a first transistor parallel circuit-connected with the capacitance of said first resistance-capacitance charging network and operable when conducting to inactivate said first network, a second transistor, a second resistance-capacitance charging network, and a voltage divider network connected across said power supply, said first transistor having a base lead connected to a first intermediate voltage level point on said divider network, said second transistor having a collector lead connected to a second intermediate voltage level point on said divider network, an emitter lead connected to common ground and a base lead connected to said second resistance-capacitance charging network, whereby said second resistance-capacitance charging network biases said second transistor into conduction during said predetermined period thereby removing said first intermediate voltage level point from the circuit and preventing conduction of said first transistor during said period.